United States Patent
Baer et al.

(10) Patent No.: US 8,814,478 B2
(45) Date of Patent: Aug. 26, 2014

(54) TOOL FOR TURNING/TURN BROACHING OR EXTERNAL MILLING OF WORK PIECES

(75) Inventors: Juergen Baer, Fuerth (DE); Markus Heinloth, Postbauer-Heng (DE); Reinhard Floiger, Petersaurach (DE); Johann Woerner, Cadolzburg-Egersdorf (DE)

(73) Assignee: Kennametal Inc., Latrobe, PA (US)

( * ) Notice: Subject to any disclaimer, the term of this patent is extended or adjusted under 35 U.S.C. 154(b) by 507 days.

(21) Appl. No.: 12/922,868

(22) PCT Filed: Mar. 6, 2009

(86) PCT No.: PCT/EP2009/001610
§ 371 (c)(1),
(2), (4) Date: Dec. 20, 2010

(87) PCT Pub. No.: WO2009/135555
PCT Pub. Date: Nov. 12, 2009

(65) Prior Publication Data
US 2011/0222973 A1   Sep. 15, 2011

(30) Foreign Application Priority Data
May 8, 2008   (DE) .................... 20 2008 006 375 U

(51) Int. Cl.
*B23C 5/24*   (2006.01)
*B23D 37/00*  (2006.01)
*B23C 5/08*   (2006.01)
*B23D 43/06*  (2006.01)
*B23C 5/22*   (2006.01)

(52) U.S. Cl.
CPC .......... *B23D 43/06* (2013.01); *B23C 2200/367* (2013.01); *B23C 5/2472* (2013.01); *B23C 5/2462* (2013.01); *B23C 5/2489* (2013.01); *B23C 5/2486* (2013.01); *B23C 5/241* (2013.01); *B23C 2215/16* (2013.01); *B23D 37/005* (2013.01); *B23C 5/08* (2013.01); *B23C 2215/20* (2013.01); *B23C 5/2234* (2013.01)

USPC .................................. 407/44; 407/36; 407/39

(58) Field of Classification Search
USPC .................... 407/12, 36–40, 44, 45
See application file for complete search history.

(56) References Cited

U.S. PATENT DOCUMENTS 4,428,704 A * 1/1984 Kalokhe ....................... 408/156
4,547,100 A * 10/1985 Naccarato et al. ............. 407/39
(Continued)

FOREIGN PATENT DOCUMENTS

DE   1206273 B   12/1965
DE   3807542 A    9/1989
(Continued)

*Primary Examiner* — Andrea Wellington
*Assistant Examiner* — Alan Snyder
(74) *Attorney, Agent, or Firm* — Larry R. Meenan, Esq.

(57) ABSTRACT

The invention relates to a tool for turning/turn broaching or external milling of work pieces rotating about longitudinal axes during machining, comprising a disc-shaped tool support having cassettes (20) disposed peripherally thereon, each of said cassettes containing a cutting insert (12, 13, 14), said cassettes being fastenable to a circular, partially circular or segmented removable support (11) that is fastened either directly to a machine spindle or indirectly to a machine spindle by way of an adapter. According to the invention, the cassette (20) comprises a plate seat with a seating surface (21) and two lateral surfaces (22, 23) as contact surfaces for the cutting insert (12, 13, 14) and can be radially adjusted by way of an adjustment member (27) and can be fastened by way of a clamping member (18); the cassette (20) further comprises a slit-shaped groove (30) parallel to the seating surface (21) for the cutting insert (12, 13, 14), said groove having opposing groove walls with a distance and angle with respect to one another that are adjustable by way of an adjustment screw (33) such that the angular position of the seating surface (20) can be changed.

8 Claims, 5 Drawing Sheets

(56) References Cited

U.S. PATENT DOCUMENTS

Figure 1:
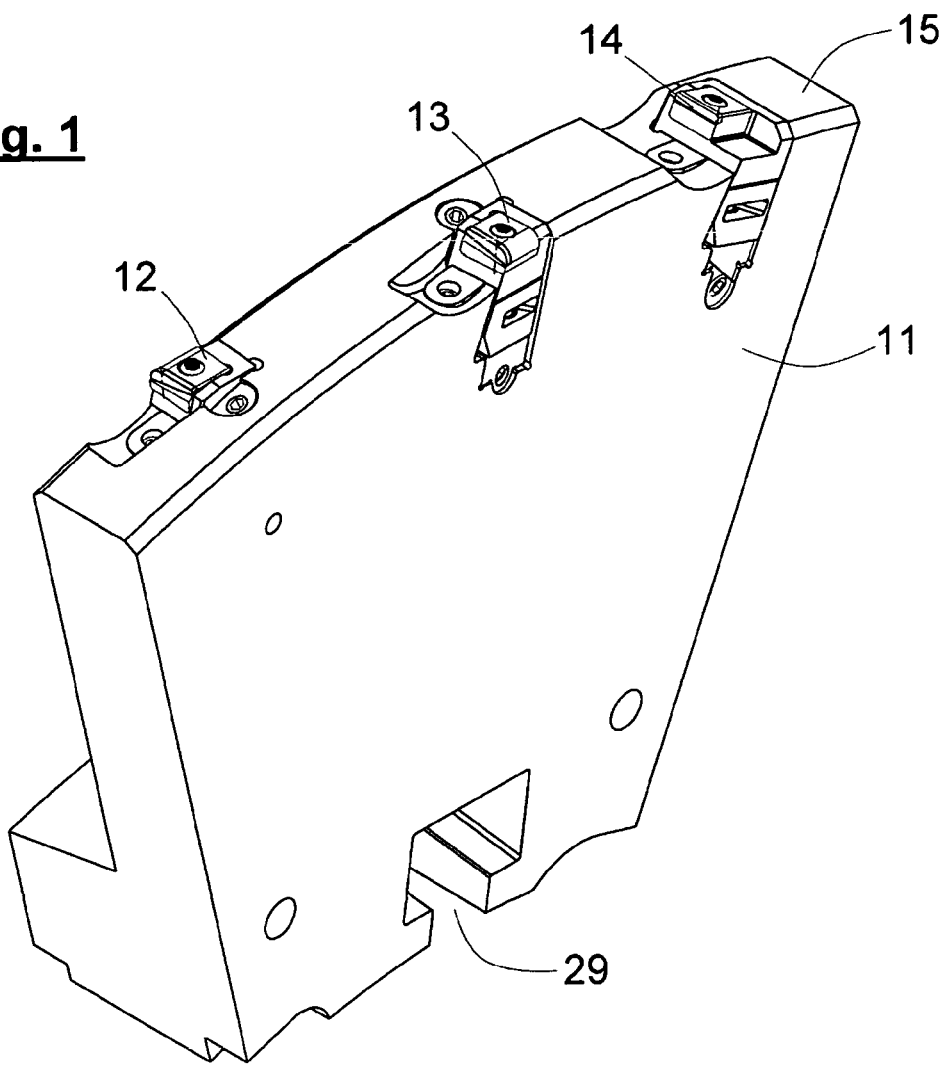

| | | | |
|---|---|---|---|
| 4,692,069 A * | 9/1987 | Kieninger | 407/39 |
| 7,037,050 B1 * | 5/2006 | Maier et al. | 407/35 |
| 2003/0143045 A1 * | 7/2003 | Gessell et al. | 409/64 |
| 2006/0002779 A1 * | 1/2006 | Bauer et al. | 409/234 |
| 2010/0104382 A1 | 4/2010 | Heinloth | |

FOREIGN PATENT DOCUMENTS

| | | |
|---|---|---|
| DE | 102006024880 A | 11/2007 |
| WO | 2006002862 A | 1/2006 |

\* cited by examiner

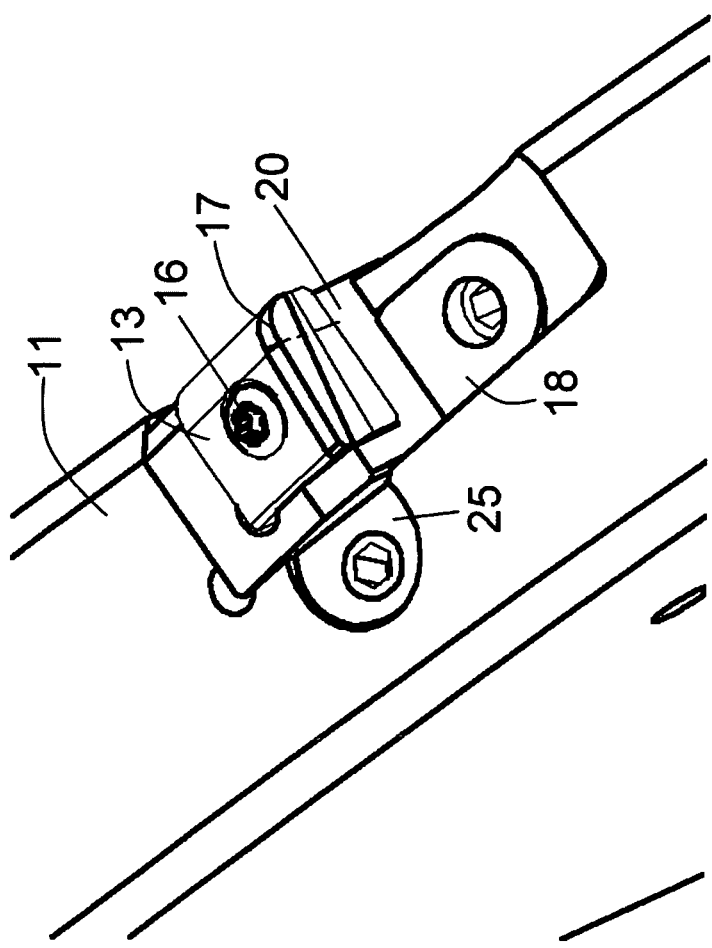

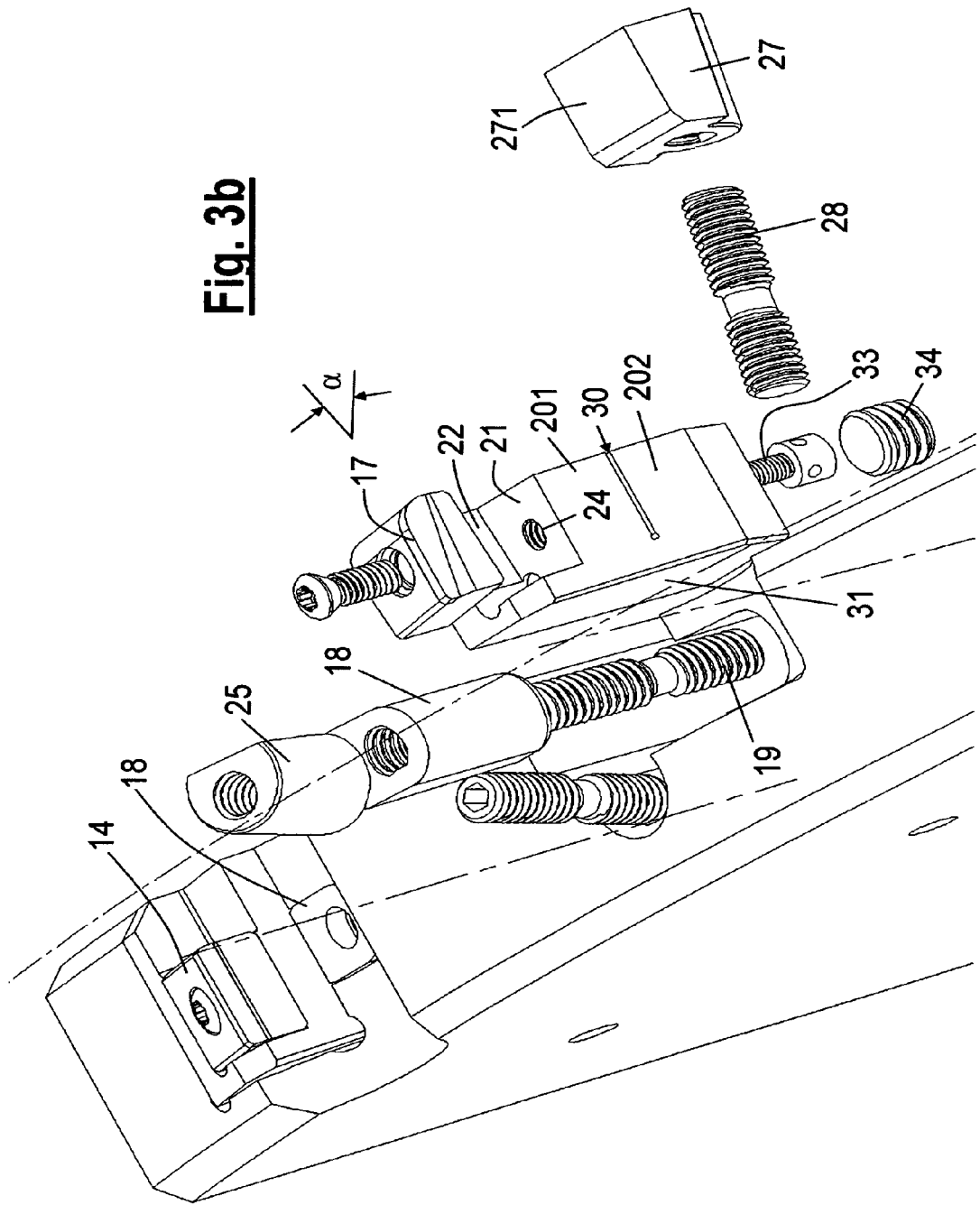

TOOL FOR TURNING/TURN BROACHING OR EXTERNAL MILLING OF WORK PIECES

CROSS REFERENCE TO RELATED APPLICATIONS

This application is the US national phase of PCT application PCT/EP2009/001610, filed 6 Mar. 2009, published 12 Nov. 2009 as WO2009/135555, and claiming the priority of German patent application 202008006375.2 itself filed 8 May 2008, whose entire disclosures are herewith incorporated by reference.

The invention relates to a tool for the turn-turn broaching or external milling of workpieces which rotate about their longitudinal axis during the machining, comprising a disk-shaped tool carrier which has peripherally arranged cassettes which are each fitted with a cutting insert and which are fastened to an annular or partly annular or segmental carrier detachably fastened either directly to a machine spindle or indirectly to a machine spindle via an adapter. Such a tool is described in German Patent Application 10 2007 013 153.6.

In addition, tools having setting devices via which axial and/or radial adjustability of the cutting inserts is possible are known from the prior art. Reference is made in this respect, for example, to DE 10 2006 024 880 A1, in which the setting device having a contour which is at least substantially L-shaped in cross section bears with both legs against the preferably substantially parallelepiped-shaped cutting insert and is radially or axially movable via a threaded screw while carrying the cutting insert along with it.

It is also known in principle to use interchangeable cassettes on tools, in particular on milling cutters, in which the cassettes in each case have individual cutting inserts fastened via a clamping screw.

The device described in German Patent Application 10 2007 013 153.6 and mentioned at the beginning has the disadvantage that the position of the cutting inserts cannot be adjusted.

The object of the present invention is to develop the tool mentioned at the beginning to the effect that the cutting inserts arranged in cassettes are adjustable radially and with regard to the angle of inclination of the active cutting edges.

This object is achieved by the tool according to claim 1.

According to the invention, the cassette has an insert seat having a seating surface and two side faces as bearing surfaces for the cutting insert to be fastened in the insert seat. The cassette can be set radially via an adjusting body and can be fixed at the desired setting via a clamping body and also has, parallel to the seating surface for the cutting insert, a slot-like groove having opposite groove walls, the distance apart of which and the inclination of which relative to one another can be set by means of an adjusting screw, such that the angular position of the seating surface can be varied. Via this variation of the angular position of the seating surface, the angular position of the cutting insert and in particular of the active cutting edges is adjusted at the same time. If the tool according to the invention is used for milling crankshafts, either true-to-size cylindricity or a slightly convex lateral surface contour can be produced via the setting of the cutting inserts.

Preferred embodiments of the tool according to the invention are described in the dependent claims.

Thus, the angular position of the seating surface for the screw insert can preferably be adjusted in such a way that the active cutting edge can be pivoted by an angle in the same radial plane in which it is arranged before the adjustment. In other words, the "camber" of the cutting edge is adjusted by this setting means.

Provided the cutting insert is arranged centrally on the periphery of the disk-shaped tool, only a radial setting is provided in addition to the above-described angular adjustability. On the other hand, if the cutting insert is fastened tangentially, but laterally on the right or left, to a side milling cutter or a turn-turn broaching tool, an axial adjusting means is preferably additionally provided. In this case, recourse may be had to the solutions known in principle according to the prior art. As a rule, this is an adjusting wedge which is displaceably arranged and permits different axial settings depending on the position.

Such adjusting bodies having wedge-shaped surfaces are preferably also used in a corresponding manner for the radial setting of the cassettes. The displaceability of the adjusting wedges is ensured via adjusting screws, which are preferably double-threaded screws.

In a specific embodiment, in order to adjust the distances between and inclinations of the groove walls, the cassette has a hole which is disposed vertically to the groove walls and passes through the latter and in which a double-threaded screw is arranged, one end of the double-threaded screw bearing against a stop which is preferably formed by the end face of a headless screw which is detachably fastened in a coaxially arranged hole in the cassette. The headless screw ensures that the adjusting screw, which, according to a further configuration, is designed as a capstan screw and can be actuated via a laterally accessible recess, obtains a stop which is variable in position.

The capstan screw remains screwed in place in the cassette and lies in tapped holes which extend on both sides of the groove. Either the groove is expanded or the distance thereof is reduced by actuating the capstan screw designed as a double-threaded screw. The headless screw, which is screwed into place in an extended larger hole in the cassette, need not be removed during this screw actuation.

According to a specific embodiment, the tool has cassettes which, except for the insert seat, are at least substantially parallelepiped-shaped, wherein a first adjusting body bears against the base surface of the cassette for the radial setting and, if present, a second adjusting body bears against a side face of the cassette for the axial setting, and the clamping body bears against a further side face of the cassette for fixing the cassette. Such a cassette construction is used for the cutting inserts which are clamped in place tangentially and which are arranged on the tool periphery laterally on the left or right.

The tool preferably consists of a disk-shaped tool carrier in which cutting inserts clamped in place in the tangential direction are arranged in an alternating sequence laterally on the left, laterally on the right and centrally. This tool serves to simultaneously machine a groove root and lateral cheeks to the left and right of a groove root.

However, by suitable design of the insert seat, the cassette described can also be used to hold a cutting insert which has been clamped in place in the radial direction.

Figure 2A:
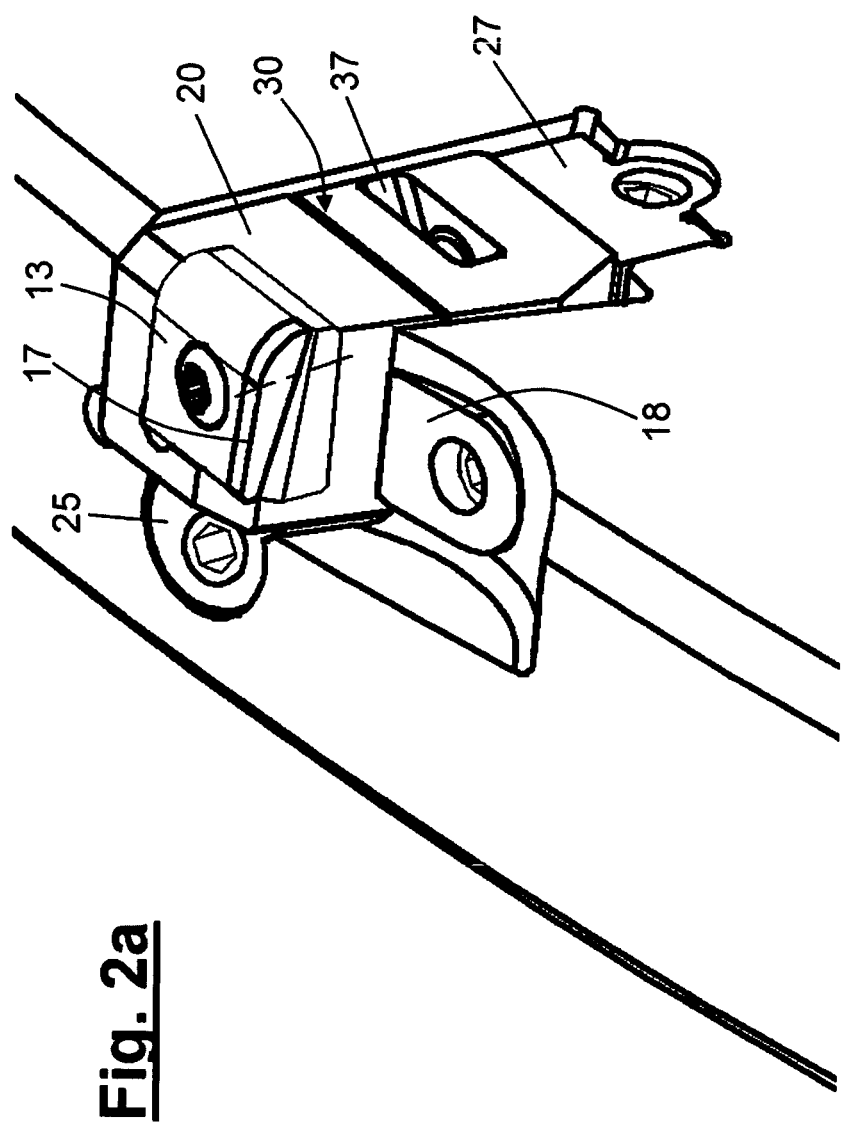
Figure 3A:
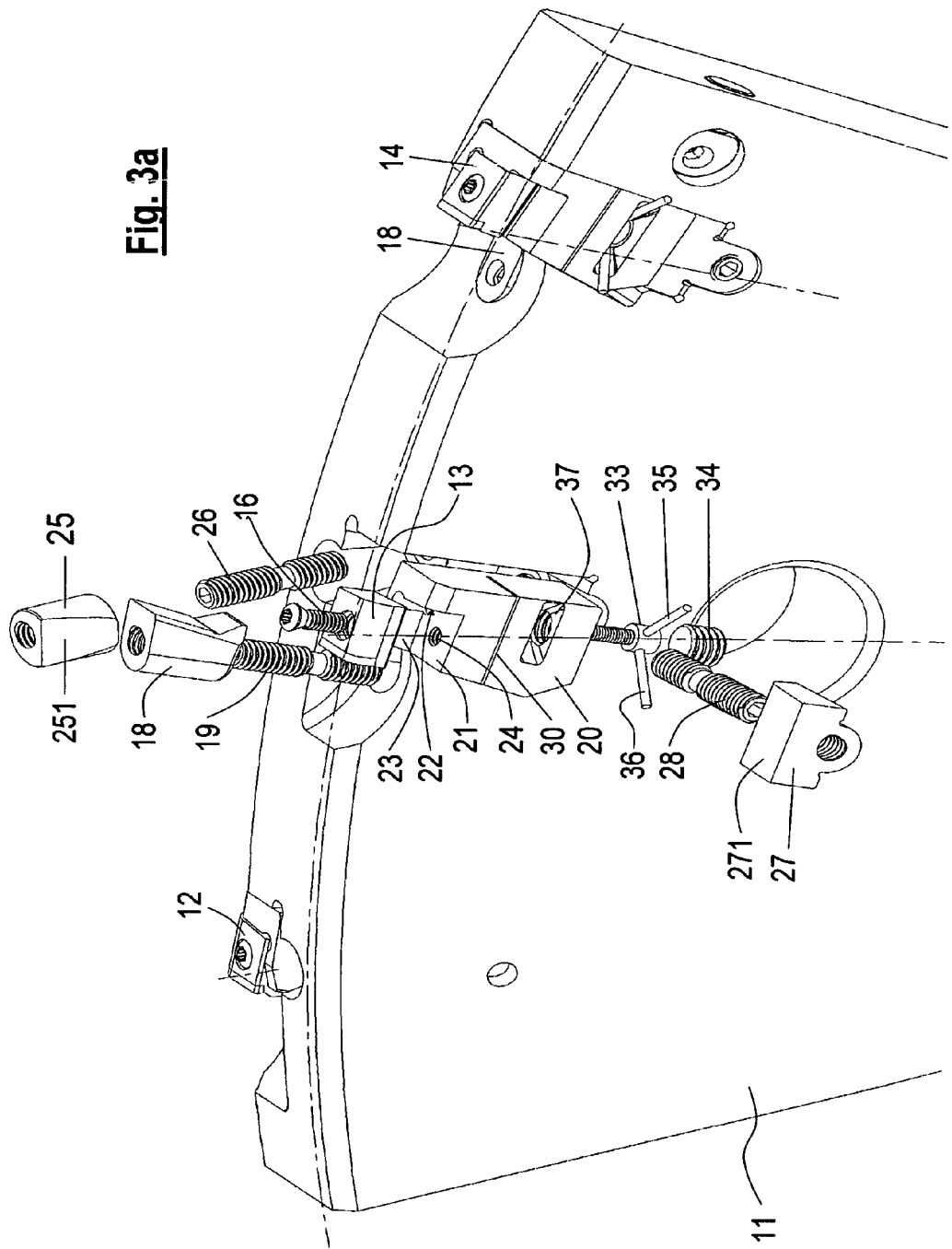

An illustrated embodiment of the tool according to the invention is shown in the drawings, in which:

FIG. 1 shows a perspective view of a tool segment having three different cassettes, FIGS. 2a, b show a detailed view of a cassette having a laterally arranged cutting insert, and FIGS. 3a, b show an exploded view of the embodiment according to FIGS. 2a, b FIG. 1 shows a segmental carrier 11 which has an open slot-like recess 29 at its lower region, the recess 29 ending blind and providing at the end thereof a stop point for a screw shank. Clamping wedges provide for the axial clamping of this segmental carrier 11 on a spindle (not shown). A plurality of segments 11 can be fastened side by side via suitable clamping pieces and can thus be fixed to form a complete ring around an existing spindle. Instead of a plurality of segments 11, a one-piece annular body can also be fastened to a spindle. Cutting inserts are arranged peripherally in respective cassettes, the cutting inserts being clamped in place tangentially in the present case. In FIG. 1, a cutting insert 12 is fastened laterally on the left, a cutting insert 13 is fastened laterally on the right and a cutting insert 14 is fastened centrally on the periphery 15 of the segment. Such an embodiment is described in detail in German Patent Application 10 2007 013 153.6. The cutting inserts 12 and 13 can be adjusted both radially and axially and also with regard to the cutting edge inclination, namely the "camber", whereas at the cutting insert 14 the axial adjusting means can be dispensed with.

As can be seen from FIGS. 2a and 2b and from FIGS. 3a and 3b in detail, the cutting insert 13 is fastened by means of a clamping screw in the insert seat of a cassette 20, which has an insert seat having a seating surface 21 and two side faces 22 and 23. The cutting insert 13 is fixed by means of a countersunk-head clamping screw 16 which passes with its shank through the center hole of the cutting insert 13 and which is screwed into the tapped hole 24 (see FIGS. 3a, 3b). The cutting insert is clamped in place tangentially and has a cutting edge 17 which runs out toward the outer side in a is convexly curved manner. The cutting insert 12 is clamped in place in a correspondingly adapted cassette, which, compared with the cassette 20 described, is constructed in mirror symmetry, but is otherwise of identical construction.

The cutting insert 14 is screwed into place in a cassette whose width is selected to be larger so that the bearing surface 23 in the illustration according to FIG. 3b is arranged further to the left. All the cassettes are fixed in a uniform manner using a clamping body 18 which can be actuated via a double-threaded screw 19. The clamping body 18 is angled at its bottom end, the obtuse angle selected being identical to the corresponding angular contour of the cassette.

An adjusting body 25 which can be displaced via the double-threaded screw 26 serves for the axial adjustment of the cassette 20. This adjusting body has a wedge surface 251, the longitudinal displacement of which enables the cassette and thus the cutting insert 13 to be moved axially. The adjusting body 27 having a wedge surface 271 serves for the radial adjustment, the adjusting body 27 being displaceable by means of the double-threaded screw 28. The cassette 20 and thus the cutting insert 13 can be radially displaced by the wedge surface 271. Adjusting bodies for the axial and radial adjustment of a cassette or of a cutting insert are known in principle according to the prior art, it also being possible to use adjusting bodies of a different kind. The cassette 20 is of substantially parallelepiped-shaped design and has a slot-like groove 30 which, as can be seen in particular from FIG. 3b, extends relatively far through the clamping body 20 up close to the rear wall 31 thereof. By expanding the groove 30, the part 201 lying above the groove 30 is moved approximately in the direction of the arrow 32, which leads to corresponding tilting of the cutting edge 17 by an angle α (shown greatly exaggerated). In this way, a fine adjustment of the camber of the cutting insert or of the cutting edge can be effected. A double-threaded screw which engages in existing holes in the parts 201 and 202 serves as an adjusting element for the gap width. This double-threaded screw is designed as a capstan screw 33, the head of which rests on a headless screw 34 in the fitted state. Socket wrenches 35 and 36 which are inserted into holes in the capstan screw are indicated in FIG. 3a only for demonstration. The capstan screw or its head bears in the fitted state against the end face of the headless screw 34, which is screwed into a hole in the cassette or the part 201. Actuation of the capstan screw is possible via the laterally accessible recess 37 in the cassette (see FIG. 3a).

For the axial, radial and angular adjustment of the cutting insert 12 or 13, the screw 19 must first of all be actuated for releasing the clamping body 18 when the tool is assembled. After that, the adjusting screws 26 and 28 can be actuated via hexagon keys, which enables the cutting insert to be displaced axially and radially. In addition, the camber of the cutting edge, i.e. its angular position, by any desired angle can be set by turning the capstan screw 33. This setting means is of course restricted by the selected slot arrangement owing to the fact that the groove distance can be varied only to a limited extent in accordance with the cassette deformability. After the selected setting of the cutting insert or of the cutting edges, the cutting insert is securely fixed via the clamping body 18 by tightening the screw 19. The cutting insert 14 which is arranged centrally tangentially in the periphery 15 requires no axial adjustment, and so the cutting insert 14 there, having a substantially linearly running cutting edge, can be adjusted only radially and with regard to the angular position of the cutting edge.

In a preferred embodiment, the arrangement of the cutting inserts 12, 13, 14 is repeated in the same sequence all around a disk-shaped cutting body.

LIST OF DESIGNATIONS

11 Segmental carrier
12, 13, 14 Cutting inserts
15 Periphery of the carrier 11
16 Clamping screw
17 Cutting edge
18 Clamping body
19 Double-threaded screw
20 Cassette
201, 202 Top and bottom part of the cassette
21 Seating surface of the insert seat
22, 23 Side faces of the insert seat
24 Tapped hole
25 Adjusting body for the axial setting
251 Wedge surface
26 Double-threaded screw
27 Adjusting body for the radial setting
271 Wedge surface
28 Double-threaded screw
29 Slot-like recess
30 Slot-like groove of the cassette 20
31 Cassette rear wall
32 Arrow
33 Capstan screw
34 Headless screw
35, 36 Socket wrenches
37 Lateral recess

The invention claimed is:

1. A tool for turning/turn broaching or external milling of a workpiece, comprising:
   a disk-shaped segmental carrier; and
   a cassette adapted to be fastened to a periphery of the segmental carrier by a clamping member, the cassette including a seating surface and two lateral surfaces for contacting a bottom surface and two side surfaces of a cutting insert mounted thereon, respectively, the cassette including a first adjusting body displaceable by a first adjusting screw for selectively adjusting a radial position of the cassette, the cassette further including a groove extending in a plane parallel to the seating surface and with opposing groove walls having a distance and angle with respect to one another, the cassette further including a threaded hole disposed perpendicular with respect to the groove walls for at least partially receiving an adjustment screw, wherein the distance and angle of the opposing groove walls are selectively adjusted by the adjustment screw, thereby selectively adjusting an angular position of the seating surface of the cassette and an inclination angle of an active cutting edge of the cutting insert with respect a plane perpendicular to the seating surface.

2. The tool as claimed in claim 1, wherein the cassette further includes a second adjusting body displaceable by a second adjusting screw for selectively adjusting an axial position of the cassette.

3. The tool as claimed in claim 2, wherein the first and second adjusting screws comprise double-threaded screws.

4. The tool as claimed in claim 2, wherein the first adjusting body has a wedge-shaped surface that provides for selective adjustment of the radial position of the cassette.

5. The tool as claimed in claim 2, wherein the second adjusting body has a wedge-shaped surface the provides for selective adjustment of the axial position of the cassette.

6. The tool as claimed in claim 1, wherein the adjustment screw comprises a doubled-threaded capstan screw having one end that bears against a stop formed by an end face of a headless screw.

7. The tool as claimed in claim 6, wherein the cassette includes a lateral recess for accessing the adjustment screw.

8. The tool as claimed in claim 1, further comprising a plurality of cassettes fastened to the periphery of the segmental carrier, each cassette having a cutting insert mounted thereon, wherein the cutting inserts are arranged on the periphery of the segmental carrier laterally on the left, laterally on the right and centrally in an alternating sequence.

* * * * *